2,741,661

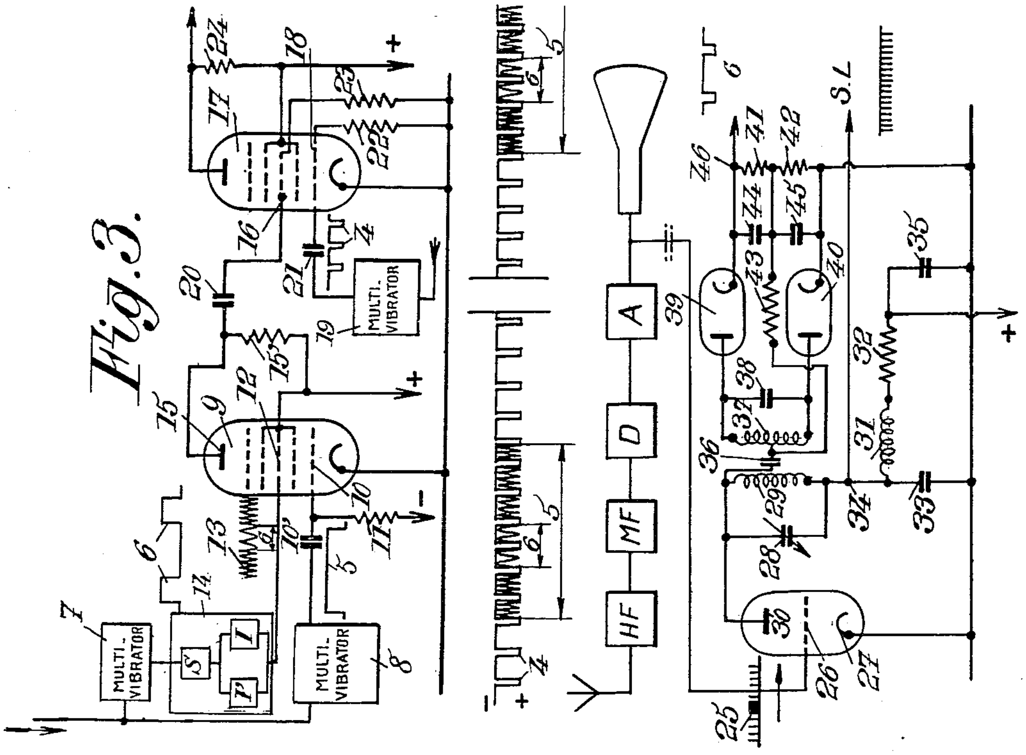
Fig. 3.
Fig. 5. Fig. 6.
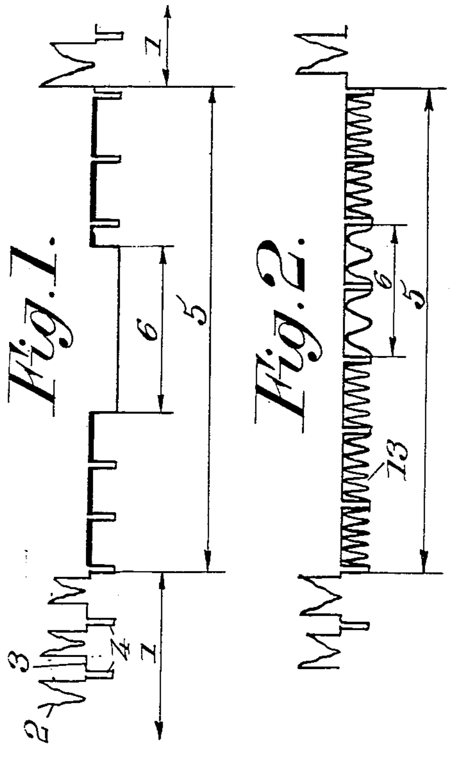
Fig. 1. Fig. 2.
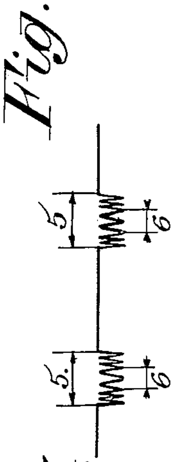
Fig. 4.
INVENTOR
HENRI DE FRANCE
BY
Bailey, Stephens & Huettig
ATTORNEYS United States Patent Office 2,741,661
Patented Apr. 10, 1956

TRANSMISSION OF HORIZONTAL AND VERTICAL PULSES AS DISTINCT FREQUENCIES

Henri De France, Paris, France, assignor to Societe Nouvelle de l'Outillage R. B. V. et de la Radio-Industrie (R. B. V.-R. I.), Paris, France, a joint-stock company Application November 9, 1949, Serial No. 126,378

Claims priority, application France November 16, 1948

2 Claims. (Cl. 178—7.1)

The present invention relates to synchronizing systems as used in television, such systems being based upon the transmission of special signals or pulses mixed with the picture modulation signal for synchronizing, at the receiver, line scanning and frame scanning with the video transmission.

It has already been proposed to use, as synchronizing signals, instead of the conventional amplitude pulses, pulses characterized by a variation of the frequency of an oscillatory amplitude modulation of the carrier. In particular, the United States Patent No. 2,356,568 to Henri de France for "Television Method and System" described the use of pulses of this kind, to constitute the frame synchronizing signals, line synchronizing being obtained through the usual amplitude pulses. The application filed by Mr. Henri de France in the United States on March 29, 1949, under Ser. No. 84,082, for "Improvements in the transmission and reception of radio-electric signals, more especially for synchronizing television pictures" brought further improvements to this system and disclosed the use, in particular for frame synchronizing, of double pulses, characterized by two successive frequency variations.

The object of the present invention is to provide still further improvements to these systems. It consists, essentially, in effecting this synchronizing signal amplitude modulation of the carrier at frequencies substantially comprised inside the range of the videofrequency signals, that is to say in constituting the synchronizing pulses by a modulation of relatively low frequency, whereby the high and intermediate frequency circuits of the transmitters and receivers can remain unchanged.

A preferred embodiment of the present invention will be hereinafter described with reference to the accompanying drawings, given merely by way of example and in which:

Fig. 1 is a television signal waveform of the conventional kind;

Fig. 2 similarly shows a television waveform in a system according to my invention;

Fig. 3 shows the portion of a television transmitter which transmits the synchronizing signals according to my invention;

Figs. 4 and 5 are diagrams illustrating the operation of a system according to my invention;

Finally, Fig. 6 shows a television receiver made according to an embodiment of my invention.

Fig. 1 shows the characteristics of a television transmission waveform of the conventional type, i. e. making use of amplitude pulses for synchronizing purposes. Zone 1 corresponds to the video frequency modulation, interrupted by blanking signals 3 and line synchronizing signals 4. Zone 5, for which the video modulation is cut off, corresponds to the frame blank signal, during which the frame synchronizing signal 6 is transmitted.

This frame synchronizing signal is constituted, according to the present invention, by a modulation at a frequency chosen relatively low so that the intermediate and high frequency circuits of the usual transmitter and receiver sets can be kept unchanged.

For instance, according to the embodiment of Figs. 2 to 5, I transmit on the carrier, by amplitude modulation thereof, during the frame blanking period, a signal 13, for instance a sinusoidal one, the amplitude of which ranges from the black level to the level of the line synchronizing pulses. This signal will be interrupted by said line synchronizing pulses (Fig. 2 being merely diagrammatic), and it will be of a frequency such that it can, at the receiver, be easily separated from the line signals or pulses that modulate it. During the interval 6 intended for the frame synchronizing signal proper, this sinusoidal signal has its frequency temporarily modified, for instance increased or reduced, it being understood that said frequency can also successively undergo variations in two opposed directions as suggested in the second of the above mentioned prior applications.

At the receiver, discriminating means, of any suitable type (in particular such as hereinafter described) will permit of detecting the above mentioned sinusoidal signal, during interval 6 and to transform it into an amplitude pulse.

The frequency of the sinusoidal (or other oscillatory) signal in question should be chosen at least equal to three times a frequency having as its period the duration of a line synchronizing pulse. By way of example, it seems that, in a high definition system (for instance 800 lines or more), it is advantageously of 5 megacycles. As for the modification during interval 6, it will be for instance 0.5 megacycle in more or in less (5.5 or 4.5 megacycles).

Concerning the means for introducing, at the transmitter, such signals into the low frequency video modulation, and removing and discriminating them, at the receiver, at the output of the intermediate frequency stage and of the detector, they may be as follows.

Fig. 3 shows the section of a transmitter intended to produce and superpose on the carrier the above mentioned sinusoidal signals. Two signal generators synchronized with the transmitter timing control are shown at 7 and 8, these generators being capable of producing respectively, the first one amplitude signals 6 during the time shown at 6 on Fig. 2 (duration of the frame synchronizing signal to be obtained) and the other one blanking signals 5 during the time shown at 5 on Fig. 2.

The signals 5 supplied by generator 8 are applied, through condenser 10', to one of the grids of a tube 9 having two control grids. The grid 10 is biased by resistance 11 which stops the electronic current of the tube, so that this current can flow only during every signal 5.

During these intervals of operation, the anode current is modulated by the sinusoidal signals 13 above referred to, these signals being applied to a second control grid 12 of tube 9.

Signals 13 are produced by a device 14 capable of supplying two different frequencies, for instance one of 5 megacycles and one of 4.5 megacycles (this last mentioned frequency during interval 6). Device 14, in the example shown by the drawing, includes two oscillators I and I' capable of generating, respectively, an oscillation of a frequency of 4.5 megacycles and an oscillation of 5 megacycles and a device S for shifting from I to I' and inversely in response to the production of a pulse by generator 7, so that I is working and I' cut off when a pulse is being generated by 7 and I' is working and I cut off during the intervals between such pulses.

Thus, the signal issuing from the plate 15 of tube 5 across a resistance such as 15' is of a form as shown by Fig. 4.

This signal is then applied to one of the control grids, to wit 16, of a second tube 17 the second grid 18 of which receives the line synchronizing signals 4 coming from a synchronized generator 19. These last mentioned signals are negative, so as to cut off the electronic current of the tube. The two grids are not biased, they are acted upon by negative signals through condensers 20, 21 and earthed through resistances 22, 23. Across plate resistance 24, I finally obtain the full synchronizing signal, such as shown by Fig. 5 and in accordance with Fig. 2.

Concerning the receivers, they include the usual high frequency apparatus HF (Fig. 6), intermediate frequency apparatus MF, detecting means D, amplifying means A, etc. I obtain on the Wehnelt device of the image tube the signal of Fig. 2 and, after separation of the synchronizing signals, I obtain the signals of Fig. 5, which are then treated in a discriminator of any suitable type, for the obtainment of amplitude pulses from the frequency modulated signals 6. Thus, for instance, I make use of a device of the type already substantially described in the second of said prior applications and which is represented by Fig. 6.

This Fig. 6 shows that the signals 25 of Figs. 2 and 5 arrive on the grid 26 of an amplifier or picture and synchronizing signal separating tube 27. The circuit of the plate 30 of this tube includes on the one hand a circuit 28, 29 tuned to the 5 megacycles frequency and on the other hand a wide band low-pass device which permits of separating the line pulses, this device being for instance calculated in such manner as to let pass only the band of frequencies lower than 1.5 megacycle (the frequency of the line pulses is within this band). The device includes for instance an impedance 31, 32 under the effect of which the frequencies lower than 1.5 megacycle produce a voltage at point 34, by closing their path to the earth through condenser 34.

At point 34 are thus obtained the line synchronizing signals, free from the 5 megacycles frequency, since the system constitutes a low-pass filter for point 34. Said signals are delivered at SL and act upon the saw-tooth generator for controlling the line scanning of the receiver.

Discrimination of the signals at 4.5 megacycles (and/or at 5.5 megacycles), that is to say of frame synchronizing signals 6, takes place in a discriminator circuit 36, 37 38 coupled with inductance coil 29, this circuit acting in a known manner on two diodes 39, 40 which act upon resistances 41, 42, 43, the high frequency path being closed through condensers 44, 45.

It is known that, under these conditions, if all the elements are suitably adjusted, the output voltage of the discriminator thus constituted will be zero for the 5 megacycles frequency, and also for the line signals which may produce damped oscillations of 5 megacycles in circuit 28, 29. On the contrary, when the frequency is shifted to 4.5 and/or 5.5 megacycles in intervals 6, an impulse is produced at point 46, which serves to trigger the saw tooth oscillators for the frame scanning at the receiver.

I thus obtain a system which has all the advantages already described in the above mentioned prior applications, ensuring, in particular, continuity of the line synchronizing signals, even during the frame synchronizing signals. But, furthermore, no change is brought to the high and intermediate frequency circuits of the transmitters and receivers.

I might dispense with the 5 megacycles frequency during the interval 5 of the image blanking and merely transmit during intervals 6 the 4.5 and/or 5.5 megacycles frequency, the discriminator remaining suitably adjusted.

On the other hand, I might restrict the duration 6 of the above mentioned modulation frequencies, possibly down to only half a line and even less, so as further to increase the precision of the interlacing at the receiver.

I might further apply the features of the application filed by the Society La Radio-Industrie on October 26, 1948, for "Improvements brought to the methods and devices of the kind of those making use of synchronizing pulses, in particular for television," according to which use is made simultaneously, for frame scanning synchronizing, of both amplitude pulses and frequency modulated pulses.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In a television transmitter including a carrier wave circuit, a generator of amplitude modulated blanking pulses and a generator of amplitude modulated frame synchronizing pulses, a system for generating frequency modulated blanking and frame synchronizing signals which comprises, in combination, a device capable of generating oscillations of either of two different frequencies both near the upper limit of the video frequency range, means controlled by said device for modulating the carrier wave in said circuit at a frequency equal to that of the oscillations generated by said device, means connected with the output of said blanking pulse generator for cutting off said modulating means at all times except during the transmission of blanking pulses by said generator, and means connected with the output of said frame synchronizing pulse generator for controlling said device to cause it to generate an oscillation of one of said frequencies during the frame synchronizing pulses and an oscillation of the other of said frequencies during the intervals between said frame synchronizing pulses.

2. A system according to claim 1 in which the frequencies of the oscillations supplied by said oscillator means are at least equal to three times a frequency having as its period the duration of a line synchronizing pulse.

References Cited in the file of this patent

UNITED STATES PATENTS

| | | |
|---|---|---|
| 2,254,435 | Loughren | Sept. 2, 1941 |
| 2,293,233 | Wheeler | Aug. 18, 1942 |
| 2,298,863 | Bartelink | Oct. 13, 1942 |
| 2,356,568 | De Franco | Aug. 22, 1944 |
| 2,435,736 | Carnahan | Feb. 10, 1948 |